United States Patent [19]

Fearing et al.

[11] Patent Number: 4,710,800
[45] Date of Patent: Dec. 1, 1987

[54] APPARATUS FOR ALLOWING OPERATOR SELECTION OF A COLOR REGION OF A VIDEO IMAGE FOR RECEIVING COLOR CORRECTIONS

[75] Inventors: Craig Fearing, Hollywood; Michael L. Orsburn, Cooper City, both of Fla.

[73] Assignee: Utah Scientific Advanced Development Center, Inc., Ft. Lauderdale, Fla.

[21] Appl. No.: 776,438

[22] Filed: Sep. 16, 1985

Related U.S. Application Data

[63] Continuation-in-part of Ser. No. 760,339, Jul. 29, 1985, which is a continuation-in-part of Ser. No. 604,845, Apr. 27, 1984, Pat. No. 4,642,682.

[51] Int. Cl.⁴ .......................... H04N 9/74; H04N 9/68
[52] U.S. Cl. ...................................... 358/22; 358/27; 358/28
[58] Field of Search .................. 358/21 R, 22, 27, 28, 358/80

[56] References Cited

U.S. PATENT DOCUMENTS

| | | | |
|---|---|---|---|
| 3,649,748 | 3/1972 | Knauer | 358/28 |
| 4,307,962 | 12/1981 | Jung | 358/80 |
| 4,413,273 | 11/1983 | Wischermann | 358/22 |
| 4,525,736 | 6/1985 | Korman | 358/27 |
| 4,533,938 | 8/1985 | Hurst | 358/27 |

Primary Examiner—John W. Shepperd
Attorney, Agent, or Firm—Jones, Askew & Lunsford

[57] ABSTRACT

A video parameter control system operative for correcting hue, saturation and luminance of a color video signal. Circuitry for generating and positioning a cursor on a video monitor displaying an uncorrected input video signal allows selection of a colored region on the monitor. Circuitry responsive to the cursor location selects one of a plurality of color correction circuits to become operative for directing video parameter correction such as hue, saturation and luminance only to regions in the video image corresponding to the hue selected by the cursor. In one embodiment, prestored digital correction values are retrieved from memory and converted into analog correction signals which modify the phase, amplitude and DC level of the composite video signal. In another embodiment, independent color derivative signals are employed in conjunction with the location of the cursor to route signals from operator controls to a channel carrying video signals of the selected hue.

32 Claims, 4 Drawing Figures

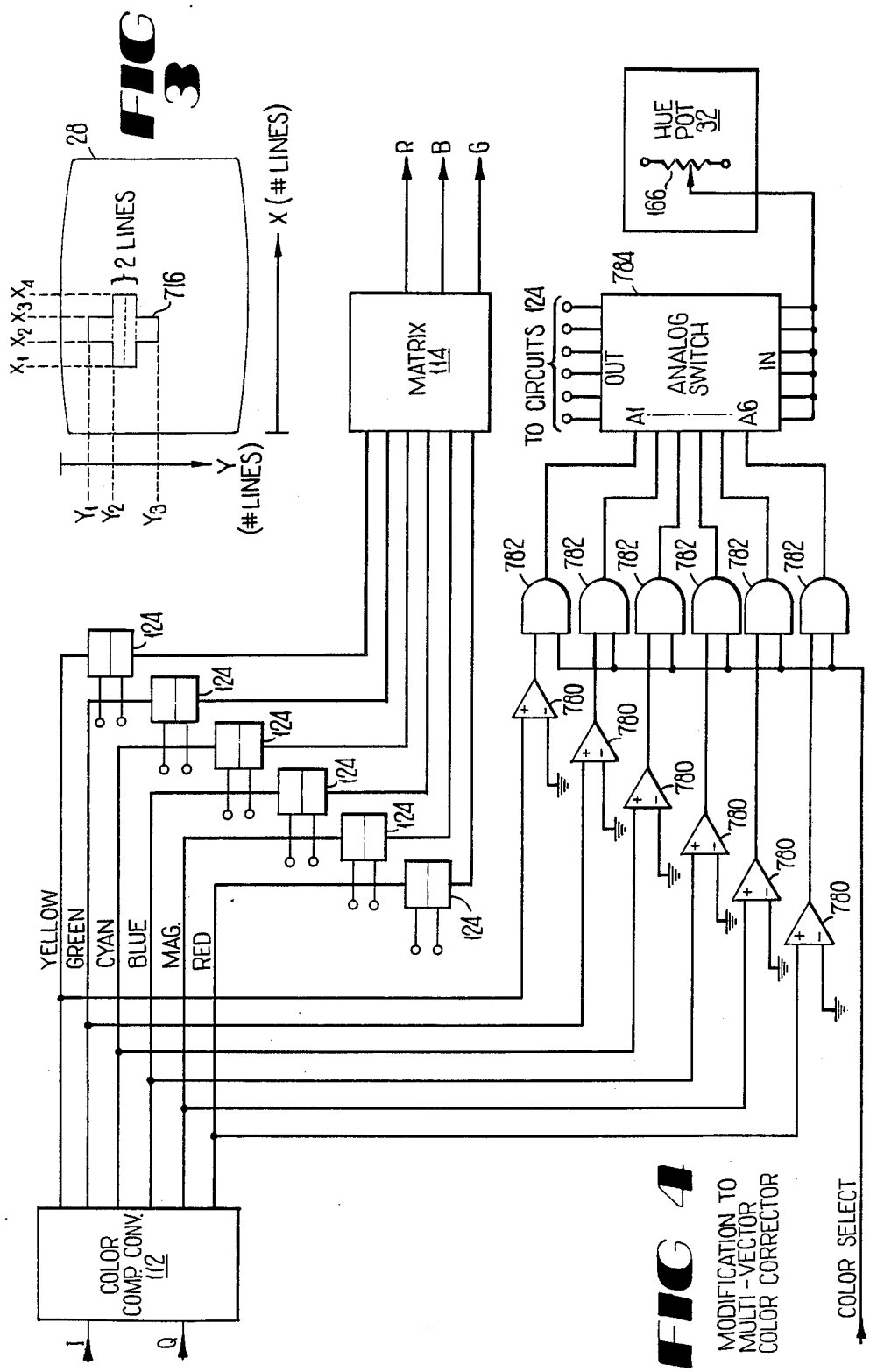

APPARATUS FOR ALLOWING OPERATOR SELECTION OF A COLOR REGION OF A VIDEO IMAGE FOR RECEIVING COLOR CORRECTIONS

CROSS-REFERENCE TO RELATED APPLICATION

This application is a continuation-in-part of application Ser. No. 760,339, filed July 29, 1985, which is a continuation-in-part of application Ser. No. 604,845, filed Apr. 27, 1984, now U.S. Pat. No. 4,642,682.

TECHNICAL FIELD

The present invention relates generally to systems for the correction and control of video signals, and relates more particularly to an apparatus for selecting a colored portion of a video image for color correction, the colored portion being represented by a color video signal produced by a motion picture telecine, video tape reproducer or other video media.

BACKGROUND OF THE INVENTION

Copending application Ser. No. 760,339 and application Ser. No. 604,845, now U.S. Pat. No. 4,642,682, the disclosures of which are incorporated herein by reference and made a part hereof, disclose a phase responsive color video signal correction system which allows correction of the spectral distribution and luminance aspects of a phase-encoded composite video signal. U.S. Pat. No. 4,096,523 to Belmares-Sarabia, the disclosure of which is incorporated herein by reference and made a part hereof, discloses another technique for color correcting video signals wherein the primary color video signals are separated into six independent primary and complementary video signals over which separate control can be exercised in making color corrections. The latter system is sometimes known as a "six vector" or "multi-vector" system.

While both of the above-referenced video signal control systems allow color correction of input video signals, both systems leave room for advancement in selecting a portion of an image represented by an input video signal for correction. Most color correction systems are generally hue oriented, in that the controls over video parameters such as hue, saturation, and luminance are grouped or organized according to hue. For example, in the Belmares-Sarabia system a panel of hue, saturation, and luminance controls is provided, there being a separate hue, saturation, and luminance control for each one of the six primary and complementary colors. In the referenced copending phase responsive video signal control system, there is also a separate hue, saturation, and luminance control for each of the color vectors or fans. Both these systems may be considered a "control per hue" system.

While there is greater selectivity in the phase responsive system which allows an operator to select a hue for correction with greater particularity, the increased number of controls available to the operator which results from greater selectivity sometimes leads to confusion in selection of a color for control. Operators of control correction systems invariably must observe the video scene to be corrected on a color monitor, and observe variations in the image as various controls are moved until the image is aesthetically satisfactory. The proliferation of possible control provided in the copending phase responsive composite video signal control system requires an operator to constantly shift his attention between the image on the video monitor and the control panel to ensure that the proper control is moved and that settings previously made to other portions of the video image are not disturbed. Upon viewing an image which includes a region whose colorimetry is unsatisfactory, the operator must mentally associate the hue of the unsatisfactory region with the set of controls having the most pronounced influence on the region. This leads to possible inefficiencies in operation and slows the color correction process. The more controls there are, i.e. the more hues over which control may be selectively exercised, the more difficult is the task of selecting the proper set.

Accordingly, there is a need for color video control circuitry which is able to select a portion of a video image for colorimetry correction without requiring an operator to mentally associate a particular hue with a particular set of controls.

SUMMARY OF THE INVENTION

The present invention overcomes certain disadvantages in the control-per-hue approach employed in the referenced copending application and the Belmares-Sarabia patent by allowing selection of a hue or colored region in the video image without requiring the operator of the system to mentally associate a hue with a set of controls. In particular, the video image is displayed on a color monitor, and a portion of the video image over which control is to be effectuated is selected by placing a cursor over a colored region of interest whose colorimetry characteristics require correction. A single set of hue, saturation and luminance controls then is automatically rendered operative to provide corrections only for the range of hues within the window represented by the hue selected by the cursor.

Briefly described, the present invention comprises in a video color correction system, an improved apparatus for selecting a color for correction including means for selecting a colored region for correction and color correction means responsive to affect the selected region only. In the preferred embodiment, a track ball or other operator control means is provided for selecting a region on a color monitor displaying an image of the input video signal for which color correction is required. A cursor which is variably positionable with respect to the displayed image is generated for selecting a color of interest and is moved with the track ball. Circuitry responsive to the location of the cursor selects one of a plurality of video signal correction signals corresponding to a parameter of the selected region, for example, the hue, saturation or luminance as a function of the selected color. Finally, color correction means responsive to the selected correction signal corrects video parameters of the input video signal to provide a corrected video output signal.

More particularly described, the present invention provides an apparatus for correcting a video parameter of a portion of a video image at least partially defined by a predetermined hue. The system of the preferred embodiment includes circuitry for detecting the predetermined hue by detecting the relative phase between the input phase-encoded composite video signal and a subcarrier reference signal, and provides a "chroma detect" signal related to the predetermined hue. Circuitry responsive to the "chroma detect" control signal recalls from a correction signal memory a particular prestored correction signal which is related to a predetermined desired value of the video parameter for that particular predetermined hue. The recalled correction signal is then employed to correct a video parameter to a desired value.

Only a single set of hue, saturation and luminance controls is required for correction of the entire color spectrum, sixteen fans in the preferred embodiment. Correction signals which reflect movement of a control knob by an operator are periodically stored in the correction signal memory during the vertical retrace interval. The memory then repeatedly provides the pre-stored correction signals each cycle of the subcarrier reference signal, synchronized at the beginning of each subcarrier cycle, and the correction signals corresponding to the selected hue of interest are updated to reflect control knob movement and to effectuate the color correction in real time.

The present invention further includes means for generating a variably positionable selection cursor on the video monitor displaying the image represented by the input video signal. Operator control means, a track ball in the preferred embodiment, is provided for positioning the cursor on the monitor, and for providing cursor position signals related to the location of the cursor with respect to the video image. Circuitry responsive to the cursor position signals provides a selection signal related to the cursor position. Correction signal selection circuitry is responsive to the coincidence of the selection signal and the chroma detect control signal for selecting a particular one of the correction signals being repeatedly provided by the correction signal memory. Finally, correction circuitry responsive to the selected correction signal corrects the input video signal to provide a color corrected video output signal.

Video parameters over which control can be exercised include the hue and saturation of the detected portion of the video image, which are controlled by shifting the phase of the phase-encoded video signal for controlling the hue and modifying the amplitude for controlling saturation, so as to actually modify the phase-encoded video signal, as disclosed in the referenced copending application. Also controllable is the luminance of the video image represented by the composite color video signal, by altering the luminance portion of the composite video signal.

In another embodiment for use in a multi-vector system, the selection signal derived from the cursor position routes DC control signals from the single set of controls to the independent primary or complementary color channel carrying the selected hue.

Accordingly, it is an object of the present invention to provide an improved system for the selection of a portion of a video image for which color control is desired.

It is another object of the present invention to provide an improved system for correction and control of color video signals.

It is another object of the present invention to provide an improved apparatus for selecting a portion of a video signal for luminance and spectral content correction.

It is another object of the present invention to provide a color video correction and control system which is able to detect hue information of a video image with greater selectivity and particularly than in the prior art.

It is another object of the present invention to provide a system for allowing selection of a portion of a video image for correction without requiring an operator to mentally associate a hue of the video image with a particular set of color correction controls.

It is another object of the present invention to provide a color video correction and control system which provides a single set of video parameter control which can be selectively associated with a region on a video image which is selected by a variably positionable cursor.

It is another object of the present invention to provide an improved color video correction and control system for controlling the hue, saturation, and luminance of a portion of a video image preparatory to broadcasting or recording the video signal representing the image.

It is another object of the present invention to provide a color video correction and control system which allows selection of a portion of a video image for correction which can be employed in a composite video signal control system as well as a multi-vector color control sytem.

It is is another object of the present invention to provide an improved color video correction and control system which effectuates control by isolating and selecting a particular hue of interest with a selection cursor, as opposed to requiring selection with one of a bank of control knobs, and effectuating control over portions of the video image containing the selected range of hues.

These and other objects, features and advantages of the present invention may be more clearly understood and appreciated from a review of the following detailed description of the preferred embodiments and by reference to the appended drawings and claims.

BRIEF DESCRIPTION OF THE DRAWINGS

FIG. 3 illustrates the geometry of the cursor generated in the preferred embodiment.

FIG. 4 is a detailed schematic diagram of the color selection circuitry adapted to be operative in a multi-vector color correction system.

DETAILED DESCRIPTION OF THE PREFERRED EMBODIMENT

Figure 1:
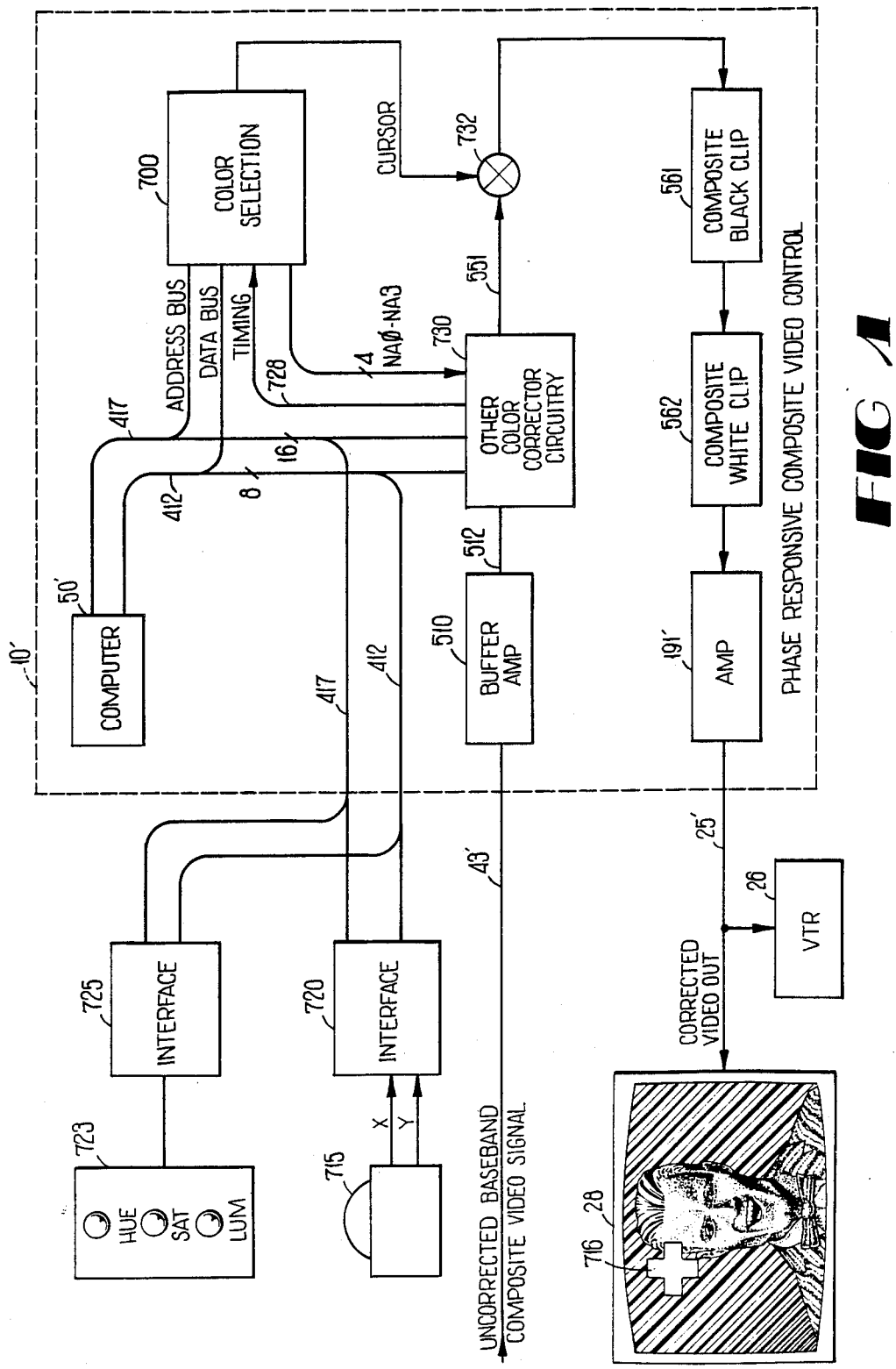
FIG. 1 is a schematic block diagram of a phase-responsive color video correction and control system incorporating the color region selection circuit of the present invention.

Referring now to the drawings, in which like numerals indicate like elements throughout the several figures, FIG. 1 shows a block schematic diagram of a phase responsive composite video signal correction or control system 10' adapted with the color selection circuit 700 constructed in accordance with the preferred embodiment. For purposes of describing the preferred embodiment, it will be understood that the color selection circuitry 700 comprises circuitry modifications to copending application Ser. No. 760,339, filed July 29, 1985 and owned by the same assignee as the present application, the disclosure of which is incorporated herein by reference and made a part hereof. Accordingly, it will be understood that the reference numbers for the components described therein are the same as herein, except as otherwise noted.

It will first be understood that the modifications described herein can be easily made to the second preferred embodiment 10' of the phase responsive composite video signal control system described in the referenced copending application. As described in that application, the phase responsive circuitry operates to detect the instantaneous hue of a video image, provides signals which select one of a plurality of color intervals or windows within which the detected instantaneous hue falls, imposes prestored correction values associated with the selected color interval, and converts the selected correction signals into signals which modify the phase, amplitude and luminance level of the composite video signal, to produce a color-corrected composite video signal output.

In order to provide color selection ability for the referenced phase responsive color correction circuitry, there is provided color selection circuitry 700 which operates in conjunction with the phase responsive video signal correction system 10'. In addition, a track ball 715, the structure and operation of which will be known to those skilled in the art, provides signals indicative of movement of the track ball by an operator to position a cursor 716 on the color monitor 28 which displays the video signal for which correction is desired. Generally, the video image will be still-framed or "frozen" by means (not illustrated) in the telecine or other video reproducer system.

The track ball 715 in the preferred embodiment is a conventional optical-encoder track ball which provides two pulse trains indicative of movement in an X and Y direction, shown in FIG. 1 as lines X and Y, to an interface circuit 720. The interface circuit is also conventional and operates to convert the pulse trains received on the X and Y input lines into a form which can be read by computer. Preferably, the pulse trains increment or decrement a pair of registers (not shown) in the interface, one for the X coordinate and one for the Y coordinate, the incrementing or decrementing being a function of the direction of movement of the track ball.

In the preferred embodiment, the interface circuit 720 is connected to the address bus 417 and data bus 412 of the microcomputer 50' so that the movement of the track ball by the operator can be converted into signals indicative of the desired position of the cursor. Conventional interfacing techniques are employed to provide the signals from the movement of the track ball to the microcomputer 50', for example, providing an interrupt to the operation of the microcomputer 50' whenever there is movement of the track ball, or alternatively providing periodic polling of the interface circuitry 720 under program control so as to read the registers containing the accumulated number of pulses reflecting movement of the track ball.

The microcomputer 50' operates to convert the X and Y movement of the track ball 715 into an absolute X and Y coordinate relative to a video frame. In particular, and with reference to the NTSC television standards, the Y coordinate can vary between 0 and 525, there being 525 lines per frame or 262.5 lines per field. The X coordinates on the video monitor are expressed in terms of the theoretical maximum pixel resolution for color television, namely, 0 through about 230. Those skilled in the art will of course understand that the horizontal pixel resolution is determined by the frequency of the subcarrier, 3.58 MHz, and that the theoretical maximum number of pixels per line of approximately 230 results from the application of the subcarrier frequency to the frame rate, at one pixel per subcarrier cycle. Thus; for a line rate of 15,734 lines per second under NTSC color standards, there are approximately:

$$3.58 \times 10^6 \text{ pixels/sec} \div 15,734 \text{ lines/sec} \cong 228 \text{ pixels/line}.$$

It will therefore be understood that the microcomputer 50' is programmed to convert the movement of the track ball 715 into an absolute X coordinate varying between 0 and 230, and into an absolute Y coordinate varying between 0 and 525. These X and Y coordinates are employed to determine the coincidence of the cursor with a colored region on a video scene being displayed, in a manner which will be described in connection with FIG. 2.

A single set of hue, saturation, and luminance controls 723 is provided for receiving operator control over a selected hue. A control knob interface 725 converts the movement of the knobs in the panel 723 into digital signals, which can then be read by the microcomputer 50' over data bus 412 in response to an address provided over address bus 417. The preferred control knob and interface is an optical encoder type, such as described in copending application Ser. No. 495,783, filed May 18, 1983, entitled "VIDEO SIGNAL CONTROL SYSTEM" now U.S. Pat. No. 4,597,006, owned by the same assignee as the present application, the disclosure of which is incorporated herein by reference and made a part hereof.

The uncorrected input baseband composite video signal is provided on line 43' from an external source (not shown) and corresponds to the similarly denominated signal in the referenced copending application Ser. No. 760,339. The uncorrected signal is provided through a buffer amplitude 510, and thence to the color correction circuitry illustrated in FIGS. 10A, 10B and 10C of the referenced copending application, generally designated at 730. It should be understood, however, that the other color correction circuitry 730 shown in FIG. 1 corresponds in particular to the video signal processing circuit components of FIG. 10C in the referenced copending parent application, and that the circuitry of FIG. 10C is controlled and supported by the circuitry of FIGS. 10A and 10B.

Figure 2:
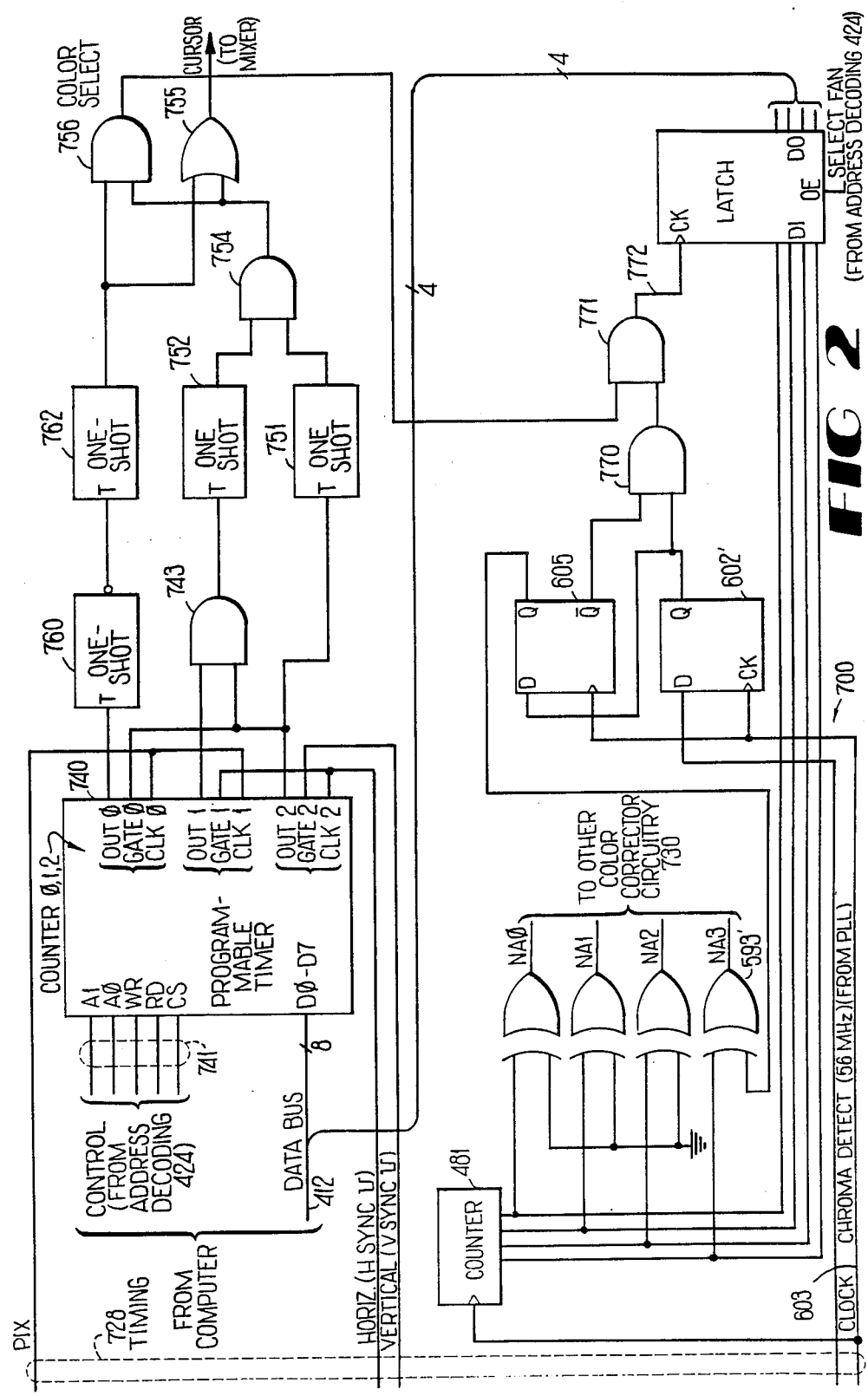
FIG. 2 is a detailed schematic diagram of the color selection circuit illustrated in FIG. 1.

As described in the copending parent application, the microcomputer 50' communicates via the data bus 412 and address bus 417 with the various components in the color corrector. Timing signals, described in connection with FIG. 2, are provided from the color corrector circuitry 730 on lines 728 to the color selection circuit 700. The output of the color selection circuit 700 is the four address lines for the ECL RAMs 430-430c (FIG. 10A of the referenced copending application) on address lines NA0-NA3, which correspond to the similarly denominated signals in the copending referenced application. Those skilled in the art will recall that these actual address lines NA0-NA3 select one of a number of prestored correction signals stored in the memories 430 in the referenced copending application, in the manner described therein.

Another output of the color selection circuit 700 is the CURSOR signal. This signal causes the generation of the variably positionable cursor on the monitor 28. The CURSOR signal is combined with the colro corrected video signal provided on line 551 from the other color correction circuitry 730, which corresponds to the same line 551 in FIG. 10C of the referenced copending application. The CURSOR signal is mixed with the color corrected video signal via a conventional video mixer circuit 732, the output of which is then provided to the composite black clip circuit 561, which corresponds to the similarly denominated circuit in the referenced copending application. Those skilled in the art will understand that the CURSOR signal is combined with the color corrected composite video signal in a manner so as to "overlay" or superimpose the cursor on the color corrected output signal by driving the video signal to white at such times as may be required to create a cursor.

The output of the color corrector 10' is provided on line 25', which corresponds to the similarly denominated signal CORRECTED VIDEO OUT in the referenced copending application, which is displayed on a color monitor 28 for viewing by the operator as the color corrections are made, and for recording the corrected signal on a video tape recorder (VTR) 26 as color corrections are recalled from computer memory for permanently preserving the color corrections.

Turning to FIG. 2, there will now be described the construction of the color selection circuit 700 and its operation in conjunction with the phase responsive color correction circuitry 10' in FIG. 1. Generally, the circuitry illustrated in FIG. 2 comprises two sections: cursor generating circuitry, which creates the visible cursor for the operator which may be moved with the track ball 715, and correction signal selecting circuitry responsive to the cursor position to select a particular correction signal. The center intersection of the cross hair or cursor produces a COLOR SELECT signal which operates in conjunction with the CHROMA DETECT signal produced by the color correction circuitry to enable the latching of the state of the ECL RAM high speed address generator. In other words, the COLOR SELECT signal, which occurs once per video frame, selects the hue of the object at the center of the cursor by latching the address being provided to the ECL RAM, which contains the correction signal for the selected hue. The latched address is then provided to the computer, which responds to the selected correction signal address by routing corrections from the controls 723 to the corresponding ECL RAM address so that the effects of operator control can be effectuated and observed. By operating a control to change the correction signals stored in the ECL RAM, the operator thereby effectuates color control only over hues within the fan or window selected by the COLOR SELECT signal.

First will be described the circuitry for generating the COLOR SELECT signal and the CURSOR signal. In order to generate the cursor, it is necessary for the microcomputer 50' to maintain an X and Y coordinate which corresponds to the line number and the pixel count of the current location of the cursor. For this function is provided a programmable timer circuit 740 which is configured to operate as three programmable one-shots. In the preferred embodiment, a type 8254 programmable interval timer manufactured by Intel Corporation of Santa Clara, Calif. is employed and connected to receive commands and data over the data bus 412 and control lines 741 from the computer. The preferred timer includes three separately configurable and addressable circuits, counter 0, counter 1, and counter 2, each of which has a separate GATE and clock (CLK) input, and provides an output OUT when the timer times out. Details of the operation and internal structure of the 8254 timer circuit are available in the literature provided by the manufacturer.

Control signals from the microcomputer 50' are provided on lines 741 from address decoding circuitry 424 described in FIG. 10A of the referenced copending application. Those skilled in the art will understand that by manipulating the address selection inputs A1, A0, the write (WR) input, the read (RD) input, and the chip select (CS) input, the timer circuit 740 can be configured to operate in the manner hererin described. The eight-bit data bus from the computer 412 is connected to the appropriate data bus lines D0-D7. It will also be appreciated that each of the three separate timer circuits within the programmable timer 740 are independently enabled by a gate input, denominated GATE0-GATE2 in FIG. 2, which operate as will be described.

It will be understood that the programmable timer circuit 740 is employed not only to generate the cursor at the appropriate time, but also to cause the cursor to possess a generally "plus" (+) or cross hair shape. With reference now to FIG. 3, there will now be described the operation of the three counters to generate the COLOR SELECT and the CURSOR signal. The first appearance of the cursor will occur at $Y_1$ number of lines after vertical blanking, as determined by counter 2, and $X_2$ number of pixels from horizontal blanking, as determined by counter 1. Counter 1 will produce an output on OUT1 every line, the appropriate number of pixels (in the X direction) over, while counter 2 counts the number of lines in the field and therefore is the "line counter". Counter 2 is clocked by the horizontal sync signal HORIZ and enabled by the vertical sync signal VERTICAL at its gate input GATE2. Counter 0 produces the broad horizontal portion ($X_1$–$X_4$) of the cursor 716 (the narrow horizontal portion $X_2$–$X_3$ is produced by other means, described next).

Counter 0 and counter 1 are clocked by a signal designated PIX, which is a 3.58 MHz signal synchronized to subcarrier. PIX is 180 degrees out of phase with respect to subcarrier on alternate lines because under NTSC standards subcarrier changes phase on alternate fields. Thus, PIX is a constant phase pixel frequency, derived from subcarrier by circuitry (not shown) known to those skilled in the art.

The signal OUT1 from counter 1 is provided to one input of an AND-gate 743, while the output OUT2 from counter 2 is provided to the other input. The signal OUT2, which occurs only on the proper line, is also provided to the gate input GATE0 of counter 0 as well as to the trigger input of a one-shot 751. The output of AND-gate 743 triggers a second one-shot 752. When counter 2 reaches the proper line, and the proper number of pixels required to reach $X_2$ has been reached, as manifested by OUT1, AND-gate 743 will trigger one-shot 752. One-shot 752 is selected with a time period so as to time-out at point $X_3$, producing the narrow width of the cursor. Thus, when the point $X_2,Y_1$ on the cursor is reached, both inputs to the AND-GATE 743 are high, firing the one-shot 752. One-shot 752 is user-adjustable by timing components (not shown) which control the time of occurrence of the cursor point $X_3,Y_1$, and thus controls the narrow width of the cursor.

One-shot 751 is triggered upon each occurrence of OUT2, when the appropriate line number in the frame has been reached, and provides a pulse during the entire cursor; when one-shot 751 times out, AND-gate 754 will be disabled and the cursor is terminated. One-shot 751 is therefore selected with a time constant sufficient to establish the point $X_3,Y_3$ of the cursor, and remains triggered for several scan lines. Increasing the time constant of one-shot 751 causes the cursor to extend a greater number of lines in the vertical (Y) direction.

The outputs of one-shots 751 and 752 are provided to inputs of an AND-gate 754, whose output is provided to the inputs of an OR-gate 755 and another AND-gate 756. The concurrent firing of one-shots 751 and 752 produce a signal on the output of AND-gate 754 and therefore causes the CURSOR signal to appear from the output of OR-gate 755, thereby defining the narrow portion of the cursor extending between $X_2$ and $X_3$.

The COLOR SELECT signal is not yet provided since this signal only occurs once per video field, notwithstanding that one-shots 751 and 752 produce pulses of sufficient width to produce a visible cursor in each field of the frame.

Counter 0 in the programmable timer 740 is provided for determining the location of the point $X_1,Y_2$, that is, the beginning of the wide horizontal or "bar" portion of the cursor 716. This counter is enabled by the signal OUT2, which it will be recalled occurs only on the appropriate line number of the beginning of cursor. Counter 0 thus times from point $X_2,Y_1$ to a point immediately before point $X_1,Y_2$, the beginning of the wide portion of the cursor. This time of course may be varied by the computer under software control, thereby affecting the height of the narrow upright portion of the cursor $X_2,Y_1$. One-shot 760 controls the precise point of $X_1,Y_2$; counter 0 is used for the majority of the delay time (to prevent jitter in the cursor), while one-shot 760 provides a user adjustable delay for precisely positioning the point $X_1,Y_2$.

One-shot 752 will fire once per line after reaching the first line of the cursor until counter 0 expires, at which time the signal OUT0 will occur, firing one-shot 760. The rising edge of the pulse provided by one-shot 760 triggers a subsequent one-shot 762, the output of which is connected to one input of AND-gate 756 and to the other input of OR-gate 755 which produces the CURSOR signal. One-shot 762 controls the time of occurrence of the cursor point $X_4,Y_2$, and thus the width of the wide bar of the cursor.

When the counter 1 times out on a line within the wide part of the cursor, producing the OUT1 signal and ultimately a signal from the AND-gate 754, there will be coincident inputs to the AND-gate 756, producing the COLOR SELECT signal. It should be understood that the counter 0 is only triggered once per video field due to its triggering by reaching the appropriate line as manifested by OUT2. It will therefore be understood that the crossbar or horizontal portion of the cursor is only two lines thick in the disclosed embodiment, and that the selection point of the cursor is the point $X_2,Y_2$, which the operator positions over a color of interest.

At such time as the one-shot 751 finally times out, the cursor point $X_3,Y_3$ will be produced, disabling any further CURSOR signal or COLOR SELECT signal until the next video field.

In order to select the appropriate color correction signal, the COLOR SELECT signal is employed to latch or freeze the ECL RAM address represented by the signals NA0–NA3. It will be recalled from the discussion in the referenced copending parent application that the CHROMA DETECT signal is delayed an amount to allow for signal propagation, and then employed on its rising edge to signify a positive crossing of the chroma portion of the phase-encoded video signal. It will be further recalled that a high speed counter 481 is employed to divide the subcarrier into a number of different color intervals or fans, each of which corresponds to a different color correction stored in the ECL RAM 430. As in the referenced copending application, counter 481 cycles through the color fans once per subcarrier cycle. The CLOCK for counter 481 and the modifications illustrated in FIG. 2 is 56 MHz, provided from the phase-locked loop circuitry 150' in the phase responsive color corrector. A clock frequency of 56 MHz allows the subcarrier to be divided into sixteen different fans or windows. This contrasts with ten described in the referenced copending application.

The 56 MHz CLOCK signal on line 603, in addition to clocking the counter 481, clocks a high speed D-type flip-flop 602', which corresponds to the flip-flop 602 in the referenced copending parent application, and a high speed D-type flip-flop 605. The CHROMA DETECT signal is provided to the D input of flip-flop 602'; the output Q of flip-flop 602' is connected to the D input of flip-flop 605, as well as to an input of an AND-gate 770. The negated-Q output of flip-flop 605 is connected to the other input of AND-gate 770. It will therefore be appreciated that a pulse of about 18 nS is provided at the output of AND-gate 770 coincident with the delayed rising edge of the CHROMA DETECT signal.

The Q output of flip-flop 605 is provided to one input of exclusive OR-gate 593', which corresponds to the exclusive OR-gate 593 in the copending referenced parent application, to perform the address complementing function described therein for twice-per-subcarrier-cycle selection of the same correction signal.

The coincident output of AND-gate 770 and the COLOR SELECT signal provides a pulse from an AND-gate 771 on line 772 to the clock (CK) of a high-speed latch circuit 775. The latch 775 in the preferred embodiment is a type SN74AS873 4-bit D-type latch with three-state outputs, manufactured by Texas Istruments. The output enable (OE) input of the latch 775, receives a signal SELECT FAN, which is provided from address decoding circuitry 424 in FIG. 10A of the referenced copending application (not illustrated). The data outputs D0 of latch 775 are connected to the data bus 412 of microcomputer 50'. Those skilled in the art will understand that microcomputer 50' can select the output lines D0 of the latch 775 to be placed on the data bus 412 under program control so that the microcomputer can determine the hue of the colored region over which the cursor is placed. It will therefore be appreciated that the data contained in the latch 775 corresponds to the selected color fan or interval coincident with the cursor.

It will now be understood that the circuitry described above provides a means for generating a variably positionable selection cursor on the video monitor displaying the input video signal, as well as circuitry for positioning the cursor on the video monitor and providing cursor position signals related to the location of the cursor with respect to the video image. In addition, the COLOR SELECT signal comprises a signal related to the cursor position with respect to the video image. The coincidence of the COLOR SELECT signal with the delayed CHROMA DETECT signal provides correction signal selecting means that are responsive for selecting a particular one of the prestored correction signals for receiving operator corrections under program control. Thus, moving a hue, saturation, or luminance control can be directed by the computer to the appropriate ECL RAM memory location so that during the vertical retrace interval the updated or revised correction values can be loaded into ECL RAM, thereby causing the desired color corrections to be imposed upon the image being displayed. Finally, it will now be appreciated that the circuitry is responsive to correct the input video signal as a function of the operator controls provided, and that the operator control is directed to the color fan selected by the operator by positioning the cursor.

It will also be understood that the present invention may be adapted for operation with a multi-vector type color correction system as described in U.S. Pat. No. 4,096,523 to Belmares-Sarabia, described and referenced above. Referring to FIG. 4, the modifications required to adapt the multi-vector color corrector illustrated in the referenced Belmares-Sarabia patent will now be described. The color correction system described in said patent employs a modified form of the RCA "CHROMACOMP" color correction unit, which is partially illustrated in U.S. Pat. No. 3,558,806 to Monahan et al. That unit includes a color component converter unit 112 (FIG. 4) which converts the I and Q signals into three independent primary color components, red, blue and green, as well as three independent complementary color component or derivative signals, yellow, cyan, and magenta. These signals are produced on lines bearing the corresponding color names. The resulting six independent color component signals in the multi-vector color corrector are delivered to control potentiometers 124 and then into a matrix 114 which conducts these signals from the control potentiometers to reform the primary color component signals red, green and blue. It is while the signals are separated into the independent primary and complementary colors that the signals are modified to effectuate color correction. In accordance with referenced U.S. Pat. No. 4,096,523, color corrections for these six independent primary and complementary colors are imposed by remotely controllable active potentiometers circuits 124, described therein.

In order to provide for selection of one of the independent colors for correction with the present invention, it is necessary to detect the coincidence of the cursor with a hue of interest. Accordingly, and as illustrated in FIG. 4, each of the six independent primary and complementary colors is provided to a conventional voltage comparator circuit 780, where the magnitude of the color component signal is compared to a reference voltage of a predetermined magnitude. Those skilled in the art will understand that the outputs of the voltage comparators 780 provide a sharp rising edge when the magnitude of the noninverting input connected to the independent color component signal exceeds the threshold magnitude of the inverting input. Inasmuch as each of the six independent color derivative signals is present only when the video image color information is predominantly the color of the particular independent color video channel, it will be appreciated that only one of the six voltage comparators 780 will provide an output at a time.

Each of the comaparator outputs is provided to one input of an AND-gate 782 provided for each channel, the other input of which is commonly connected to the COLOR SELECT signal. The COLOR SELECT signal is generated as illustrated in FIG. 2 and in the manner described above. In a similar fashion, the CURSOR signal is generated as shown and described in connection with FIG. 2, and mixed with the corrected video signal in a manner which will be understood by those skilled in the art.

The outputs of the AND-gates 782 are provided to respective select inputs A1–A6 of an analog switch circuit 784. The preferred analog switch is a pair of type AD7510DI CMOS analog switches manufactured by Analog Devices, Inc. of Norwood, Mass. The analog inputs IN of the analog switch 784 are commonly connected to control potentiometers for varying a particular parameter of the video signal, for example, a single hue potentiometer 32 which is employed for adjusting the hue as illustrated in FIG. 4. The six outputs OUT of analog switch are provided as the DC control signals supplied to the respective potentiometer circuits 124 in the manner described in the referenced U.S. Pat. No. 4,096,523. It will be therefore be appreciated that a single hue potentiometer 32 is employed to provide hue control as opposed to providing a separate hue control for each of the six channels, and that the hue over which control is effectuated is determined by the placement of the cursor by the operator. The coincidence of the COLOR SELECT signal and a signal provided from one of the comparators 780 results in a routing of the signal from the hue pot 32 to the particular one of the remotely controllable active potentiometer circuits 124 carrying the signal having the hue of interest.

It will also be understood and appreciated that a single saturation and luminance potentiometer can be similarly routed by structure illustrated in FIG. 4 to appropriate remotely controllable potentiometer circuits 124 for control over these parameters as well. Further discussion of the operation of the remotely controllable potentiometer circuits 124, and the other supporting circuitry in the referenced U.S. Pat. No. 4,096,523 may be found therein.

It will now be understood that the circuitry illustrated in FIG. 4 provides a plurality of video parameter correction signals in a multi-vector color corrector, inasmuch as the six independent color derivative signals are employed to control the routing of a correction signal from the hue pot 32 to the appropriate channel containing a signal over which correction is desired. It will be further understood that the circuitry provides means for selecting a particular one of these correction signals in conjunction with the COLOR SELECT signal for selecting a particular one of these video parameter correction signals, and that the routing of correction from the hue pot 32 to the appropriate active potentiometer circuit 124 provides correction means responsive to a selected one of the video parameter correction signals for providing corrected video output signals.

The preferred embodiments of the present invention have been disclosed by way of example and it will be understood that other modifications may occur to those skilled in the art without departing from the scope and the spirit of the appended claims.

What is claimed is:

1. In a video signal color correction system, an apparatus for selecting a region in a video image represented by an input video signal and for correcting a video parameter of said input video signal, comprising:
   first operator control means for selecting a region on a video monitor displaying said image;
   video signal correction means responsive to a video characteristic of said input video signal for selecting a particular one of a plurality of video signal correction signals for correcting a parameter of said input video signal to provide a corrected video output signal;

second operator control means for changing one of said plurality of video signal correction signals; and means responsive to said video characteristic and said selected region for modifying said selected particular one of said video signal correction signals.

2. The apparatus of claim 1, wherein said video parameter is the hue of said selected region of said video image.

3. The apparatus of claim 1, wherein said video parameter is the saturation of said selected region of said video image.

4. The apparatus of claim 1, wherein said video parameter is the luminance of said selected region of said video image.

5. The apparatus of claim 1, wherein said first operator control means selects a region as a function of the color of said region.

6. The apparatus of claim 1, wherein said video signal correction means comprises a phase responsive video signal correction system.

7. The apparatus of claim 1, wherein said video signal correction means comprises a multi-vector video signal correction system.

8. The apparatus of claim 1, wherein said second operator control means provides color control signals corresponding to a color correction provided by an operator for said selected region, and wherein said color control signals are utilized for modifying said particular one of said video signal correction signals.

9. The apparatus of claim 8, further comprising addressable memory means for storing said plurality of correction signals in a plurality of addressable locations, and wherein said second control means is operative to load said addressable memory with correction signals corresponding to operator corrections.

10. The apparatus of claim 1, wherein said video signal correction means comprises addressable memory means for storing a plurality of correction signals in a plurality of addressable locations, counter means for addressing said memory means, and synchronizing means for resetting said counter means to a predetermined initial address at predetermined intervals such that said memory means repeatedly provides said plurality of correction signals, and wherein said modifying means is responsive to select one of said plurality of said correction signals being provided by said memory means.

11. The apparatus of claim 1, wherein said first operator control means comprises:

means for selecting an electron beam X-coordinate on a video monitor display of said video image;

means for selecting an electron beam Y-coordinate on said video monitor display of said video image;

means responsive to provide a selection signal upon the coincidence of the video monitor electron beam with said X-coordinate and said Y-coordinate; and wherein said modifying means is responsive to said selection signal for modifying said selected particular one of said video signal correction signals.

12. The apparatus of claim 11, wherein said X-coordinate selecting means and said Y-coordinate selecting means comprises track ball means.

13. The apparatus of claim 11, wherein said X-coordinate selecting means comprises X counter means responsive to load with a predetermined X number corresponding to the X location of said selected region of said video image, to count as a function of the X position of the video monitor electron beam, and to provide an X signal upon the concurrence of the video monitor electron beam and said predetermined X number;

wherein said Y-coordinate selecting means comprises Y counter means responsive to load with a predetermined Y number corresponding to the Y location of said selected region of said video image, to count as a function of the Y position of the video monitor electron beam, and to provide a Y signal upon the concurrence of the video monitor electron beam and said predetermined Y number; and further comprising:

means responsive to the concurrence of said X signal and said Y signal for providing said selection signal.

14. The apparatus of claim 1, wherein said second operator control means is a hue control, a saturation control, or a luminance control.

15. The apparatus of claim 1, wherein said first operator control means comprises a trackball and a cursor on said video monitor.

16. The apparatus of claim 1, wherein said video characteristic is the hue of said selected region of said video image.

17. The apparatus of claim 1, wherein said selected particular one of said plurality of video signal correction signals is modified by said modifying means during the vertical retrace interval.

18. A system for correcting a video parameter of an image represented by an uncorrected input video signal, comprising:

means for generating a variably positionable selection cursor on a video monitor displaying said input video signal;

first operator control means for positioning said cursor on said video monitor;

means responsive to the position of said cursor on the video monitor for providing cursor position signals;

video signal correction means responsive to a video characteristic of said input video signal for selecting a particular one of a plurality of video signal correction signals for correction of a parameter of said input video signal to provide a corrected video output signal;

second operator control means for changing one of said plurality of video signal correction signals; and means responsive to said video characteristic and said cursor position signals for modifying said selected particular one of said video signal correction signals.

19. The system of claim 18, wherein said first operator control means comprises track ball means.

20. The system of claim 18, wherein said second operator control means is operative to provide color control signals corresponding to a color correction provided by an operator; and further comprising programmed computer means responsive to associate color control signals with said selected particular one of said video signal correction signals, whereby color controls made by an operator are associated with a selected color region of the image.

21. The system of claim 20, further comprising addressable memory means for storing said plurality of video signal correction signals in a plurality of addressable locations, and wherein said second control means is operative to cause said computer means to load said addressable memory with correction signals corresponding to operator corrections.

22. The system of claim 18, wherein said video signal correction means comprises addressable memory means for storing a plurality of video signal correction signals in a plurality of addressable locations, counter means for addressing said memory means, and synchronizing means for resetting said counter means to a predetermined initial address at predetermined intervals such that said memory means repeatedly provides said plurality of video signal correction signals, and wherein said modifying means is responsive to select one of said plurality of said video signal correction signals being provided by said memory means for modifying.

23. The apparatus of claim 18, wherein said selected particular one of said plurality of video signal correction signals is modified by said modifying means during the vertical retrace interval.

24. A system for correcting a video parameter of an image represented by an uncorrected phase-encoded input video signal, comprising:
   phase detecting means responsive to detect relative phase between said input video signal and a phase reference signal;
   correction signal means responsive to said phase reference signal for providing a plurality of correction signals, each of said correction signals being related to a predetermined range of phase differences between said phase reference signal and said input video signal;
   means for generating a variably positionable selection cursor on a video monitor displaying said input video signal;
   first operator control means for positioning said cursor on said video monitor;
   means responsive to the position of said cursor on the video monitor for providing cursor position signals;
   second operator control means for changing one of said plurality of correction signals;
   correction signal selecting means responsive to said cursor position signals and a video characteristic of said input video signal for selecting a particular one of said plurality of correction signals for receiving changes from said second operator control means; and
   correction means responsive to said plurality of correction signals for correcting said input video signal to provide a corrected video output signal.

25. The system of claim 24, wherein said video parameter is a color parameter, and wherein said second operator control means provides color control signals corresponding to a color correction provided by an operator; and further comprising programmed computer means responsive to associate said color control signals with said selected particular one of said correction signals, whereby color controls made by an operator are associated with a selected color region of the image.

26. The system of claim 25, further comprising addressable memory means for storing said plurality of correction signals in a plurality of addressable locations, and wherein said second control means is operative to cause said computer means to load said addressable memory with correction signals corresponding to operator corrections.

27. The system of claim 24, wherein said correction signal means comprises addressable memory means for storing a plurality of correction signals in a plurality of addressable locations, counter means for addressing said memory means, and synchronizing means for resetting said counter means to a predetermined initial address at predetermined intervals related to said phase reference signal such that said memory means repeatedly provides said plurality of correction signals each cycle of said phase reference signal, and wherein said correction signal selecting means is responsive to select one of said plurality of said correction signals being provided by said memory means.

28. The apparatus of claim 24, wherein said selected particular one of said plurality of correction signals is changed by said correction signal selecting means during the vertical retrace interval.

29. A system for correcting a video parameter of a portion of a video image represented by an uncorrected phase-encoded input video signal, said portion of said video image being at least partially defined by a predetermined hue, comprising:
   phase detecting means responsive to detect said predetermined hue by detecting relative phase between said input video signal and a phase reference signal and responsive to provide a chroma detect signal related to said predetermined hue;
   correction signal means responsive to said phase reference signal for repeatedly providing a plurality of correction signals, each of said correction signals being related to a predetermined range of phase differences between said phase reference signal and said input video signal;
   synchronizing means for causing said correction signal means to provide said plurality of correction signals each cycle of said phase reference signal;
   means for generating a variably positionable selection cursor on a video monitor displaying said video image;
   first operator control means for positioning said cursor on said video monitor and for providing cursor position signals related to the location of said cursor with respect to said video image;
   means responsive to said cursor position signals for providing a selection signal related to the cursor position with respect to said video image;
   correction signal selecting means responsive to the coincidence of said selection signal and said chroma detect signal for selecting a particular one of said correction signals;
   second operator control means for changing said selected particular one of said plurality of correction signals; and
   correction means responsive to said correction signals for correcting said input video signal to provide a corrected video output signal.

30. The apparatus of claim 29, wherein said selected particular one of said plurality of video signal correction signals is changed during the vertical retrace interval.

31. In a video signal color correction system, an apparatus for selecting a region in a video image represented by an input video signal and for correcting a video parameter of said input video signal, comprising:
   first operator control means for selecting a region on a video monitor displaying said image;

addressable memory means for storing a plurality of video signal correction signals for correcting a parameter of said input video signal;

second operator control means for providing operator correction signals;

correction signal selecting means responsive to a video characteristic of said input video signal and said selected region for selecting a particular one of said stored plurality of video signal correction signals for receiving said operator correction signals;

means for utilizing said stored video signal correction signals for correcting a parameter of said input video signal to provide a corrected video output signal.

32. The apparatus of claim 31, wherein said particular one of said stored plurality of video signal correction signals receives said operator correction signals during the vertical retrace interval.

* * * * *